United States Patent [19]

Kirchner et al.

[11] Patent Number: 5,745,685
[45] Date of Patent: Apr. 28, 1998

[54] PROTOCOL EXTENSION IN NSPP USING AN ACKNOWLEDGMENT BIT

[75] Inventors: Michael Kirchner; Sridhar Krishnaswamy; Norman Reed; Greg Young, all of Cedar Rapids, Iowa

[73] Assignee: MCI Communications Corporation, Washington, D.C.

[21] Appl. No.: 581,745

[22] Filed: Dec. 29, 1995

[51] Int. Cl.⁶ ........................................ H04L 1/14
[52] U.S. Cl. ........................ 395/200.14; 371/32; 371/33; 371/34; 395/200.09
[58] Field of Search ................... 370/60, 94.1; 371/32, 371/33, 34; 395/200.09, 200.14

[56] References Cited

U.S. PATENT DOCUMENTS

| | | | |
|---|---|---|---|
| 4,410,889 | 10/1983 | Bryant et al. | 340/825.2 |
| 4,654,654 | 3/1987 | Butler et al. | 340/825.5 |
| 4,970,714 | 11/1990 | Chen et al. | 370/17 |
| 5,245,616 | 9/1993 | Olson | 371/32 |
| 5,444,849 | 8/1995 | Farrand et al. | 395/200.09 |
| 5,519,699 | 5/1996 | Ohsawa | 370/60 |

FOREIGN PATENT DOCUMENTS

| | | |
|---|---|---|
| 0 186 343 A2 | 7/1986 | European Pat. Off. . |
| 0 409 578 A1 | 1/1991 | European Pat. Off. . |
| 0 570 220 A2 | 11/1993 | European Pat. Off. . |

Primary Examiner—Kenneth S. Kim

[57] ABSTRACT

The invention provides a mechanism for acknowledging in a NSPP environment when a data packet has been received at a destination. The invention provides an Ack Bit in the NSPP header of a data packet. If acknowledgment of receipt is not received, the data packet is resent. A timer may be used to determine the length of time to wait for acknowledgment.

21 Claims, 6 Drawing Sheets

PROTOCOL EXTENSION IN NSPP USING AN ACKNOWLEDGMENT BIT

BACKGROUND OF THE INVENTION

1. Field of the Invention

The invention relates to acknowledging receipt of information that is being transferred between a client and a server. More particularly, the invention relates to an acknowledgment bit that allows a data packet to request acknowledgment of its receipt.

2. Related Art

Network operating systems are a combination of programs that give computers and peripherals the ability to accept a request for service across the network and give other computers the ability to use those services. Servers are computers that share their hard-disk drives, attached peripherals such as printers and CD-ROM drives, and communications circuits. Servers inspect requests for proper authorization, check for conflicts, and then provide the requested service.

Client/server computing is important because it allows personal computers to access very large libraries of data without drowning in the information or swamping the network. In the client/server network architecture, the client computer sends a generalized request for information to the file server. Special software in the file server interprets the generalized requested, takes the detailed steps (such as extensive indexing and sorting) needed to fill the request, and delivers the results to the client computer. Using client/server techniques, applications running on client computers can have access to huge information databases. Client applications rely on the network for connectivity and such services as messaging and database access.

Operator services networks are set up with either a human or automated operator at a workstation, which is connected to the operator services network. A user at a remote location requests service access via the operators, which, in turn, establish access to the service. Specifically, the operator uses a client application loaded on a client computer at the workstation, which is connected to the operator services network, to access the service. Then the required data is transferred between the client application and the service.

Presently, messages requesting a service are sent from a client application to a server sequentially. The server acts on the messages from the client in the order they are received.

If the message requires a response from the server, then the client will not be assured that the message was received by the server until the response sent by the server is received by the client. If a response to the message is not required, then the client may never be assured that the message was received by the server.

In an effort to be assured that messages sent by the client application have been received by the server, duplicate messaging has been used by users in an effort to confirm receipt of a message by the server (referred to as the double send scenario). In particular, when a first message is sent to the server and then a second message identical to the first message is sent to the same server, the server recognizes that a duplicate message has been sent. Then, the server will send a message back to the client application indicating that a duplicate message was sent, thereby indicating that the first message indeed was received by the server, otherwise, the server could not have identified a duplication. This process for confirming whether a message has been received by a server unnecessarily utilizes additional band width.

There is a protocol mechanism referred to as a window that throttles the sender of messages. That is, the sender will not get more than x messages ahead of what the recipient has acknowledged. However, because the sender can get x messages ahead of the recipient, there will be a delay in the recipient reading the last message sent by the sender and therefore a delay in the sender identifying a duplicate message. As a result, there is a delay in receiving a response from the recipient indicating that a duplicate response has been received by the recipient.

What is needed is a reliable and efficient way of confirming that a message sent by the client application to the server (or server to client application) has been received by the server. What is further needed is a way to automatically initiate resending the message as needed.

SUMMARY OF THE INVENTION

An advantage of the invention is to provide acknowledgment that a packet has been received by a recipient.

Another advantage of the invention is to provide a guarantee within a short time frame that a packet has been received by a recipient.

Another advantage of the invention is to provide a backup for resending the packet if receipt of the packet is not acknowledged.

The invention relates generally to a system and method for acknowledging receipt of a data transfer between a source location and a destination location.

The invention provides for the sending of a packet from the source location to the destination location. The packet includes an acknowledgment mechanism and a first sequence. The packet is received at the destination location. The control packet is sent from the destination location to the source location. The control packet includes a second sequence. The control packet is received at the source location where the first sequence is compared with the second sequence. Receipt of the packet at the destination location is confirmed when the first sequence matches the second sequence.

BRIEF DESCRIPTION OF THE FIGURES

The foregoing and other features and advantages of the invention will be apparent from the following more detailed description of the invention, as illustrated in the accompanying drawings.

DETAILED DESCRIPTION OF THE PREFERRED EMBODIMENTS

An embodiment of the invention is now described with reference to the figures with like references numbers indicate identical or functionally similar elements. Also in the figures, the left most digit of each reference number corresponds to the figure in which the reference number is first used. While specific configurations and arrangements are discussed, it should be understood that this is for a illustrative purposes only. A person skilled in the relevant art would recognize that other configurations and arrangements can be used without departing from the spirit and scope of the invention. It will be apparent to a person skilled in the relevant art that this invention can also be employed in a variety of other devices and applications.

I. Operator Services Network

Figure 1:
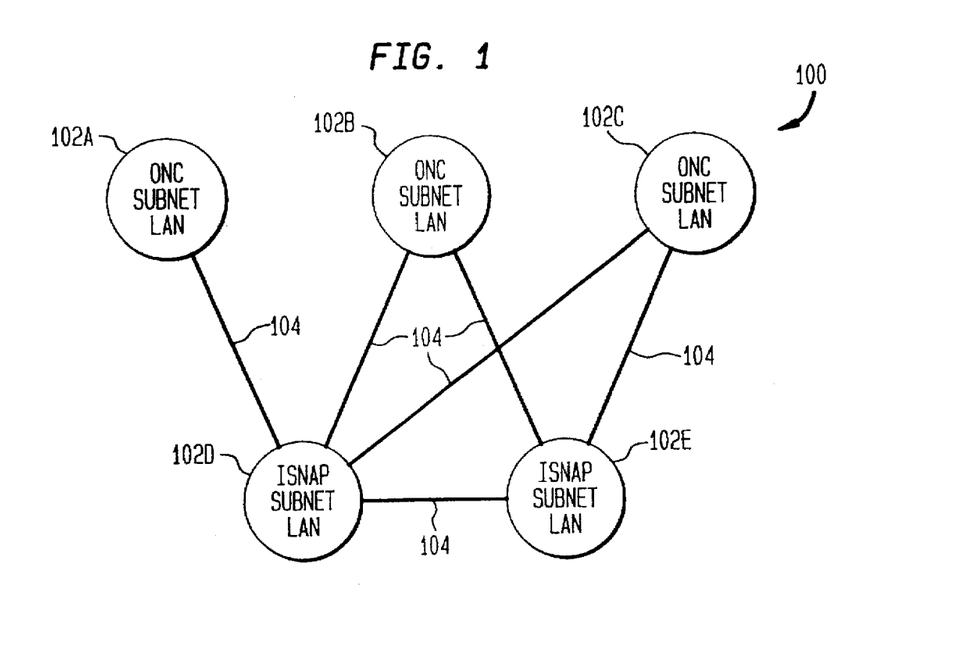
FIG. 1 shows a block diagram of an Intelligent Services Network (ISN) wide area network (WAN)

The Intelligent Services Network (ISN) is MCI's operator services network which provides both automated and manual services. The invention is described in the context of MCI's ISN for convenience. The invention is not limited to this environment. Existing services include, for example, audio service, validation service, database service and switch service. The physical architecture of the ISN is based on a routed wide area network (WAN), as shown generally in FIG. 1 at 100. WANs are used if a permanent connection is desired between two or more geographically-distant LANs. As shown, the WAN 100 comprises a grouping of interconnected local area network (LAN) subnets 102. A router 104 connects each LAN; the router 104 transfers messages from one LAN 102 to the next. The transfer may take place over, for example, an EtherNet. LAN subnets 102 are comprised of Intelligent Services Network Adjunct Processors (ISNAPs) 102D and 102E and Operator Network Centers (ONCs) 102A, 102B and 102C.

Figure 2:
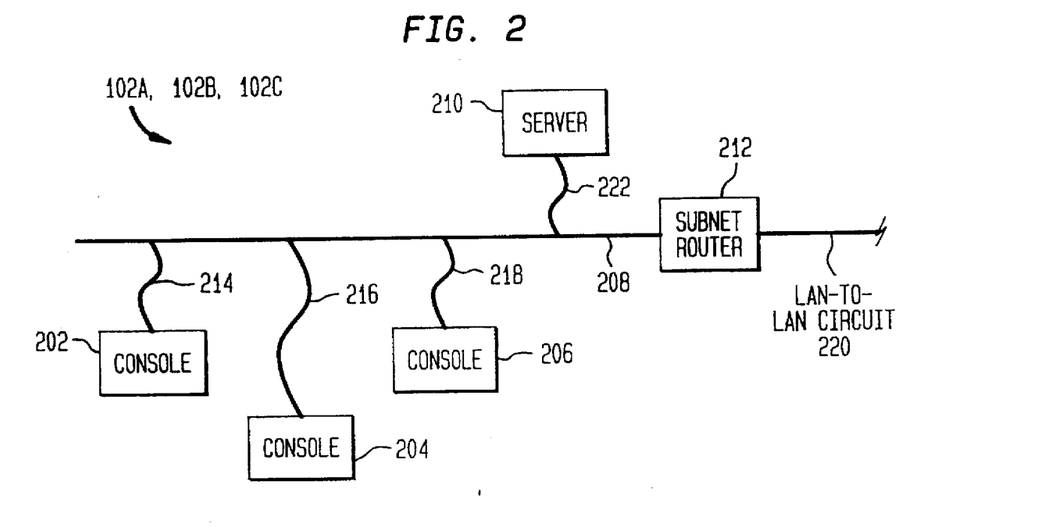
FIG. 2 shows a block diagram of the hardware associated with an Operator Network Center (ONC) shown in FIG. 1.

As shown in FIG. 2, each ONC subnet LAN 102A, 102B, 102C includes manual operator consoles 202 and 204 and an automated operator console 206 interconnected with a network physical link 208, such as Ethernet, by conventional connector cables 214, 216 and 218, respectively. A database server 210 is also interconnected with physical link 208 by a connector cable 222. Physical link 208 connects with a LAN-to-LAN circuit 220 via a subnet router 212.

Figure 3:
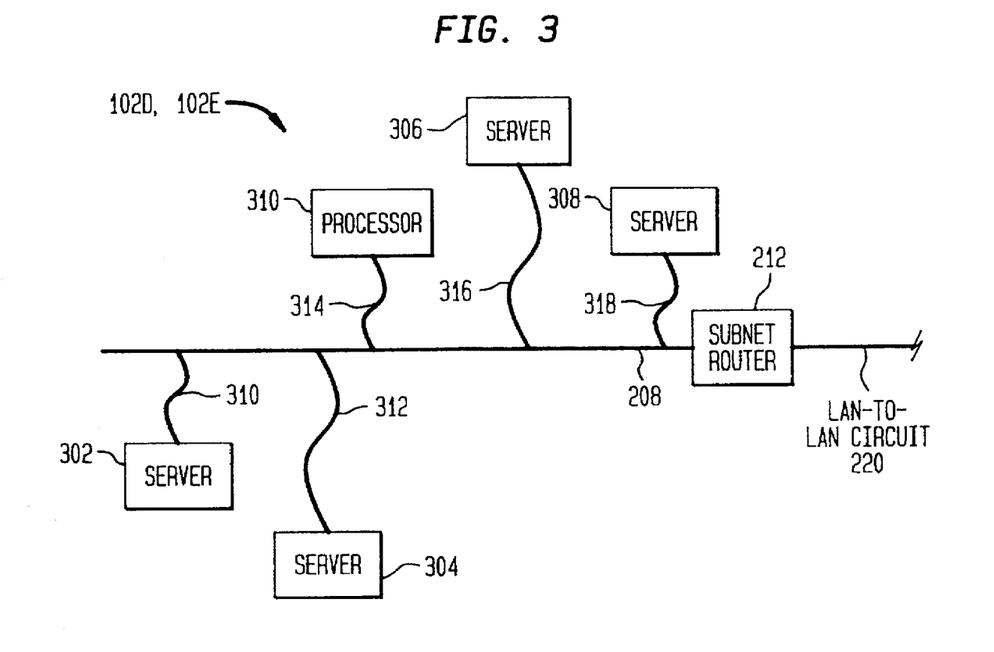
FIG. 3 shows a block diagram of the hardware associated with the Intelligent Services Network Adjunct Processors (ISNAPs) shown in FIG. 1.

As shown in FIG. 3, each ISNAP subnet LAN 102D and 102E includes an audio server 302, a validation server 304, a database server 306 and a switch server 308 interconnected with physical link 208 by connector cables 310, 312, 316 and 318. An automated call processor 310 is interconnected with physical link 208 by a connector cable 314. As discussed with reference to FIG. 2, physical link 208 connects with LAN-to-LAN circuit 220.

Figure 4:
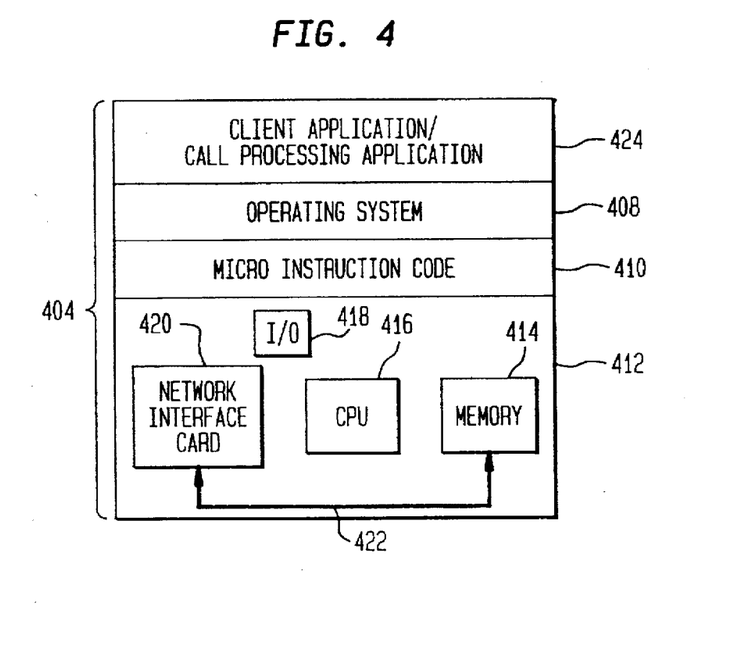
FIG. 4 shows computer platform used for the manual and automated operator consoles shown in FIGS. 2 and 3.

The manual and automated operator consoles 202, 204 and 206 and automated call processor 310 comprise workstations such as a computer platform shown generally in FIG. 4 at reference number 404 for purposes of this discussion. Computer platform 404 includes hardware units 412 including one or more central processing units (CPUs) 416, a memory structure 414, a conventional input/output (IO) interface 418 and a network interface card 420. Memory 414 and network interface card 420 communicate via a parallel transfer over an expansion bus shown generally as 422. The computer platform 404 includes an operating system 408, such as DOS, Windows, or UNIX and may include micro instruction code 410. A client application 424 resides on operating system 408. The client application 424 communicates with a service application on one or more of servers 210, 302, 304, 306 and 308 as will be discussed in detail below.

The LAN subnets 102 and the components on each LAN subnet are interoperable in accordance with the Open Systems Interconnection (OSI) reference model. The OSI reference model is an international standard for the organization of LANs established by the International Standards Organization and the Institute of Electrical and Electronic Engineers. The OSI reference model establishes hardware independence in LANs. The OSI reference model separates the communication process into distinct layers as shown generally in FIG. 5 at 500. The layers include: the physical hardware layer 502, the data link layer 504, the network layer 506, the transport layer 508, the session layer 510, the presentation layer 512 and the application layer 514.

Figure 5:
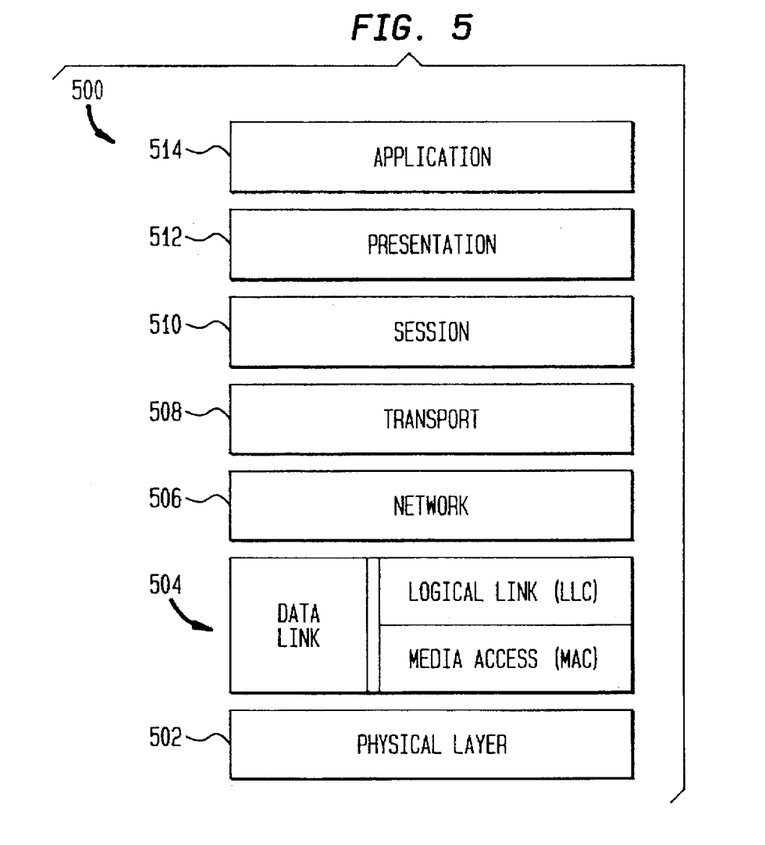
FIG. 5 shows an Open Systems Interconnection (OSI) reference model.

The application layer 514 is the highest level. Application layer 514 includes utility programs and application software. It interfaces with users, retrieves information from databases, and transfers whole files. The application layer 514 is the part of the OSI model that is visible to the user. The application layer 514 turns the LAN accesses into work requests that it then passes to the next layer down, the presentation layer 512. The application layer 514 does not do any real work itself, but delegates all tasks to the lower layer, the presentation layer 512. A work request to be sent across the network enters the OSI model protocol stack at the application layer 514, travels downward toward the first layer (the physical layer 502), zips across to the other workstation or server, and then travels back up the protocol stack until the work request message reaches the application on the other computer through the other computer's own application layer 514.

The presentation layer 512 receives work requests from the application layer 514, or it delivers a response to the application layer 514. This layer 512 exists to hide differences between different kinds of computers. When different types of computers all want to talk to each other, some translation and byte-reordering is necessary. This presentation layer 512 converts data into or from a machines's native internal number format. The presentation layer 512 also compresses the messages into an encrypted form, for security purposes. When delivering messages, the presentation layer 512 encrypts the messages. Once its job is finished, the presentation layer 512 submits its results to the next layer down, the session layer 510.

Computers on LANs use names or numbers to identify each other. The session layer 510 uses each computer's identification to call another computer, in the same way one uses a telephone number to make telephone calls. The session layer 510 makes the initial contact and manages the progress of the call. The call itself is a session—an exchange of messages, a dialog, between two workstations or a workstation and a server. The functions in this session layer 510 enable applications at two different locations to coordinate communications into a single session.

The transport layer 508 is the only layer that concerns itself with making sure that the information sent by one computer on the network is received properly by another computer. The transport layer 508 knows the maximum size of each LAN packet and breaks up a work request message (or response) into smaller packets as necessary. When more than one packet is being process at any one time, this layer controls the sequencing of the message packets and also 'regulates inbound traffic flow. If a duplicate packet arrives (perhaps the result of a retransmission), this layer recognizes and discards it. The transport layer 508 delegates the work of routing packets to the next lower layer, network layer 506.

The network layer 506 plans the routing of the packets. The message packets may need to travel through several LAN segments to get to their final destinations. The network layer 506 keeps track of the different routes that a message packet may need to travel. The network layer 506 inserts this routing information into each message packet, to help the intermediate computers and devices forward the message packet to its destination. This layer takes responsibility for addressing and delivering messages, end-to-end, from source computer to final destination.

The data link layer 504 is the most complex. It encompasses the sending of the characters that make up a message packet on a character-by-character basis. Because of its complexity, the data link layer 504 is broken into a Media Access Control (MAC) layer and a logical link control (LLC) layer. The MAC layer manages network access (token-passing or collision-sensing, for example) and network control. The LLC layer, operating at a higher level than the MAC layer, sends and receives the user data messages and packets (typically file service request and responses).

The physical layer 502 only needs to turn the characters making up a message packet into electrical signals. This layer does not need to process routing information, computer names, or the other contents of a message packet. Because the other layers already have done their supervisory work, the physical layer 502 merely has to send or receive the electrical signals through the LAN cable. This part of the OSI model 500 specifies the physical and electrical characteristics of the connection that make up the network. It encompasses things like twisted pair cables, fiber optic cables, coaxial cables, connectors, repeaters, and so on.

The present invention will be discussed with respect to LANs utilizing the OS/2 and UNIX operating system, although the present invention may be used in any of the available operating systems. The UNIX computer may act as a file server by using software at the UNIX host computer that accepts requests from workstations, processes those request, and returns the appropriate response to the workstation. UNIX applications can be run alongside the file server software. The UNIX operating system can use the Transmission Control Protocol/Internet Protocol (TCP/IP) suite to send data among computers. TCP/IP is a layer of protocols, not a network operating system. IP provides datagram communications between nodes (workstations) on a network. Because TCP/IP is a public, not a proprietary, protocol, it has become extremely popular as the basis for interconnecting LANs from different vendors. TCP/IP works on a peer networking concept. All computer systems connected by a TCP/IP network are peers from the network's viewpoint, although some computers will have more function and capabilities than others, of course. The architecture of TCP/IP is based on a layer of protocols and the Internet address, a standard computer-identification scheme. On a local or wide-area basis, TCP/IP routes messages between networks and between computer systems on each network.

Figure 6:
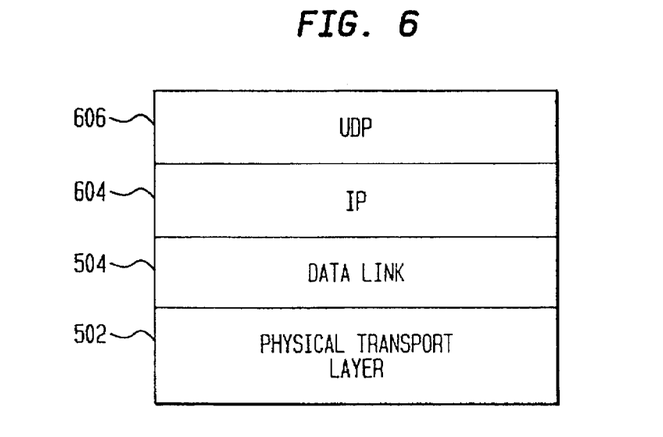
FIG. 6 shows the kernel space of a UNIX based protocol stack.

TCP/IP consists of two protocols, IP and TCP. Often, though, people use TCP/IP as a generic name for a collection of protocols and utility software programs. FIG. 6 shows the relationship of these peer protocols. FIG. 6 shows only the kernel space of the OSI protocol stack. Physical layer 502 underneath TCP/IP can be EtherNet or another physical medium for sending and receiving packets of information. Both LANs and WANs can use TCP/IP to exchange information. IP layer 604 is the first, lowest layer of TCP/IP and is above the data link layer 504, which is above the physical layer 502. User Datagram Protocol (UDP) layer 606 is one type of TCP/IP protocol that uses IP. Another intermediate protocol that uses IP is the Internet Control Message Protocol (ICMP). ICMP enables the exchange of control and error messages between IP hosts.

Figure 9:
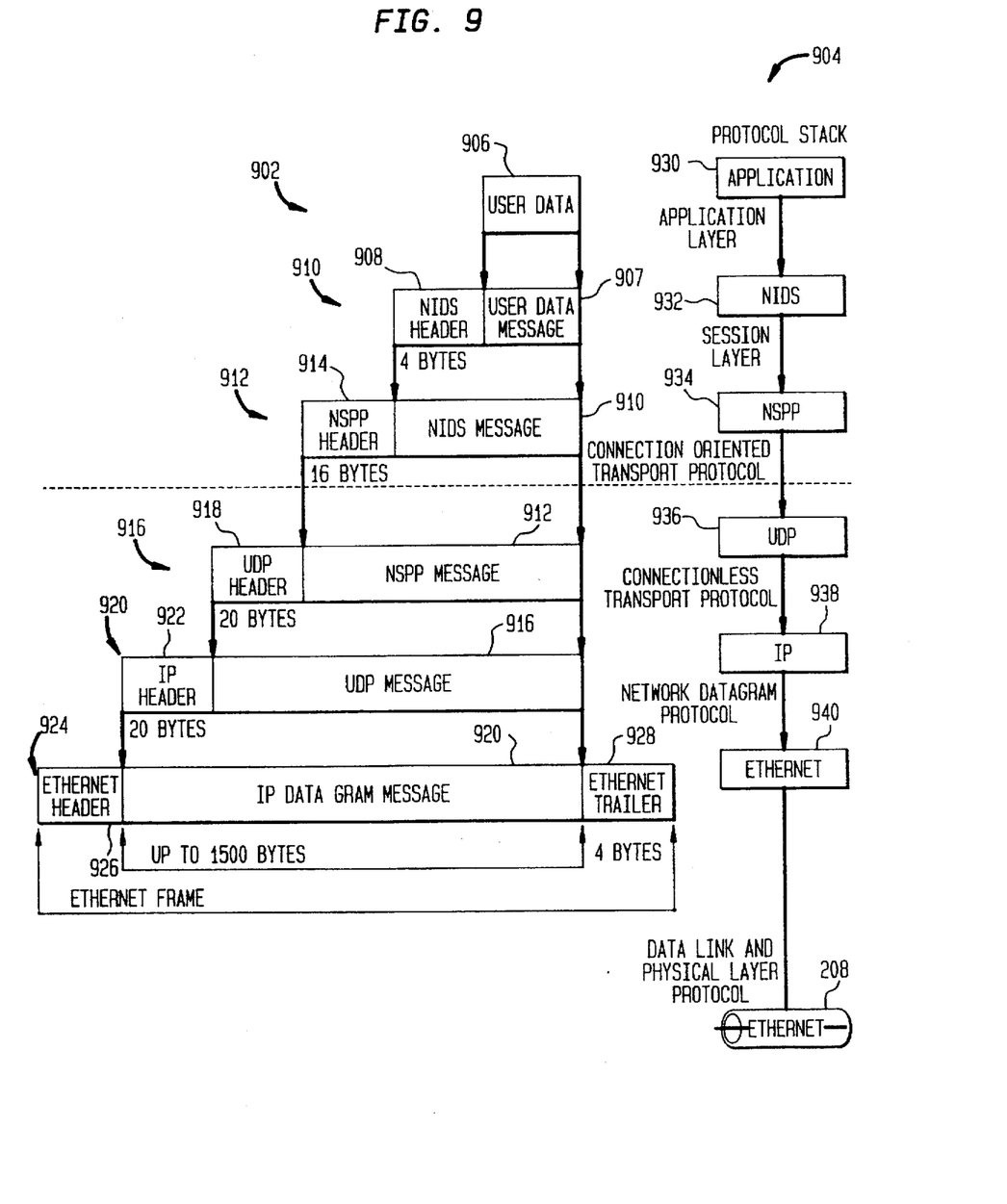
FIG. 9 shows the high level data encapsulation method used for NSPP.

The basic unit of information exchange is a datagram packet, which will be discussed in greater detail with reference the FIG. 9 in the following discussion. The IP portion of TCP/IP provides for the routing of packets from computer to computer, and this is the only job it does. Higher level protocols and software do not concern themselves with the routing of packets. The IP protocol layer on a network can forward datagrams to their destinations without help from higher level protocols. IP does not guarantee delivery of packets.

UDP uses IP to send and receive messages. UDP does not provide for guaranteed delivery of messages. However, UDP is relatively fast.

Figure 7:
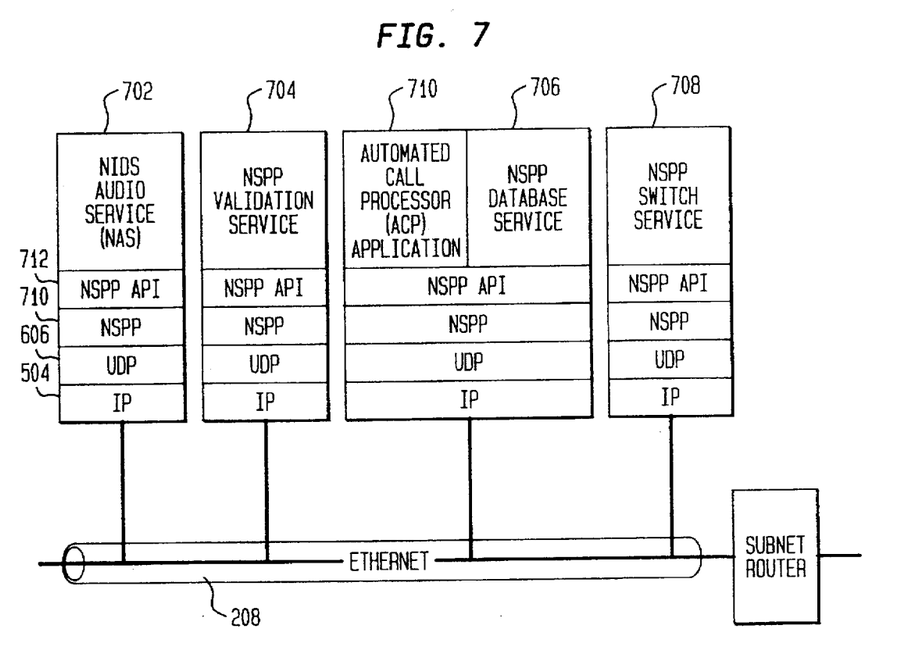
FIG. 7 shows the ISNAP components of the WAN.

As shown in FIG. 7, ISNAP subnet LANs 102D and 102E include associated hardware discussed in FIG. 3, services shown generally at 702, 704 and 706 are provided by application programs executing in ISNAP subnet LANs 102D and 102E. Services 702, 704 and 706 comprise a Network Information Distribution Service (NIDS) audio service 702, NIDS Sequenced Packet Protocol (NSPP) validation service 704 and NSPP database service 706 reside on servers 302, 304 and 306, respectively. Services 702, 704 and 706 are needed to interface with an operated services switch NSPP 708, which resides on server 308. ISNAP subnets LANs 102D and 102E also include components of the automated operator services needed for an Automated Call Processor (ACP) application 710, which resides on processor 310. ACP application 710 and database service 706 are shown together. However, they may reside on independent platforms as illustrated in FIG. 3 by processor 310 and server 306.

Figure 8:
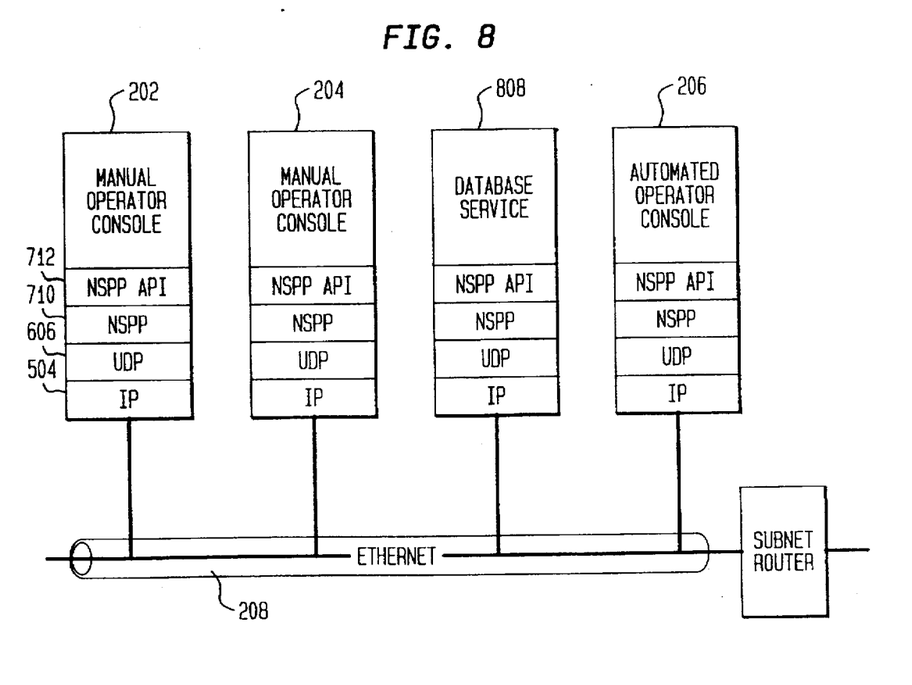
FIG. 8 shows the ONC components of the WAN.

Referring now to FIG. 8, ONC subnet LANs 102A, 102B and 102C contain manual operator console platforms (PC based) 202 and 204, automated operator console platform (PC based) 206 and a database service 808, which resides on server 210. Switch and validation services for ONC subnet LANs 102A, 102B and 102C are obtained from the associated NSPP switch service 708 and NSPP validation service 704 in ISNAP subnet LANs 102D and 102E.

As shown in FIGS. 7 and 8, between UDP layer 606 and each service layer 702, 704, 710, 706, 708, 202, 204, 808, respectively, and 206 is NSPP protocol layer including NSPP layer 710 and a NSPP Application Program Interface (API) layer 712. NSPP layer 710 is a communications layer that provides fast reliable transport environments for client/server communications. Client applications make requests of service applications and the services respond as needed. For example, a database query will result in returning the database lookup results. The NSPP API layer 712 is a session layer.

The NSPP protocol is supported on several different operating systems, such as, UNIX, DOS (clients only), OS/2, VOS (Stratus, clients only), VMS (VAX) or Open VMS (Alpha). The implementation of NSPP differs slightly under each of these operating systems due to performance considerations, such as multitasking capability, process overhead, and thread support.

II. Data Encapsulation (NSPP)

A packet is a group of bits, including address, data, and control elements, that are transmitted together. FIG. 9 shows an example packet as packet 924, which is expanded out and shown generally at 902. FIG. 9 also shows the high level data encapsulation method used for NSPP.

The IP data gram construction, shown generally at 902, is sequentially constructed as it passes through the protocol stack 904. The IP data gram comprises user data 906; a NIDS message 910, which includes NIDS header 908 and user data/message 907; an NSPP message 912, which includes NSPP header 914 and NIDS message 910; a UDP message 916, which includes a UDP header 918 and NSPP message 912; an IP data gram message 920, which includes an IP header 922 and UDP message 916; an Ethernet message 924, which includes an Ethernet header 926, an Ethernet trailer 928 and IP data gram message 920.

Protocol stack 904 includes application layer 930, NIDS layer 932 as a session layer, NSPP layer 934 as the connection oriented transport protocol layer, UDP layer 936 as the connectionless transport protocol layer, IP layer 938 as the network datagram protocol layer, Ethernet layer 940 as the data link and physical layer and Ethernet 208.

The user data 906 is supplied by the application. The NIDS and NSPP headers are provided. Then, the UDP and IP headers are added to form the IP datagram that is passed over the Ethernet. To remove the IP datagram from the Ethernet, the IP datagram is broken down in the reverse order as the protocol layers are passed through in an ascending order from the data link and physical layer protocol 940 to the application layer 930, rather than the descending order just described.

The NIDS header 908 includes, for example, future protocol (which is a place holder), a client handle (used to associate a server with a client), a message ID file, service type destination queue, an opcode field and message length. The NSPP header 914 includes a sequence header and a stream header. The sequence header includes, for example, sequence number information, a connection ID, a packet type, a current packet number, and protocol modifier bits. The stream header includes, for example, packet number, the total number of packets and the stream ID.

III. Ack Bit

A. Overview

Figure 10:
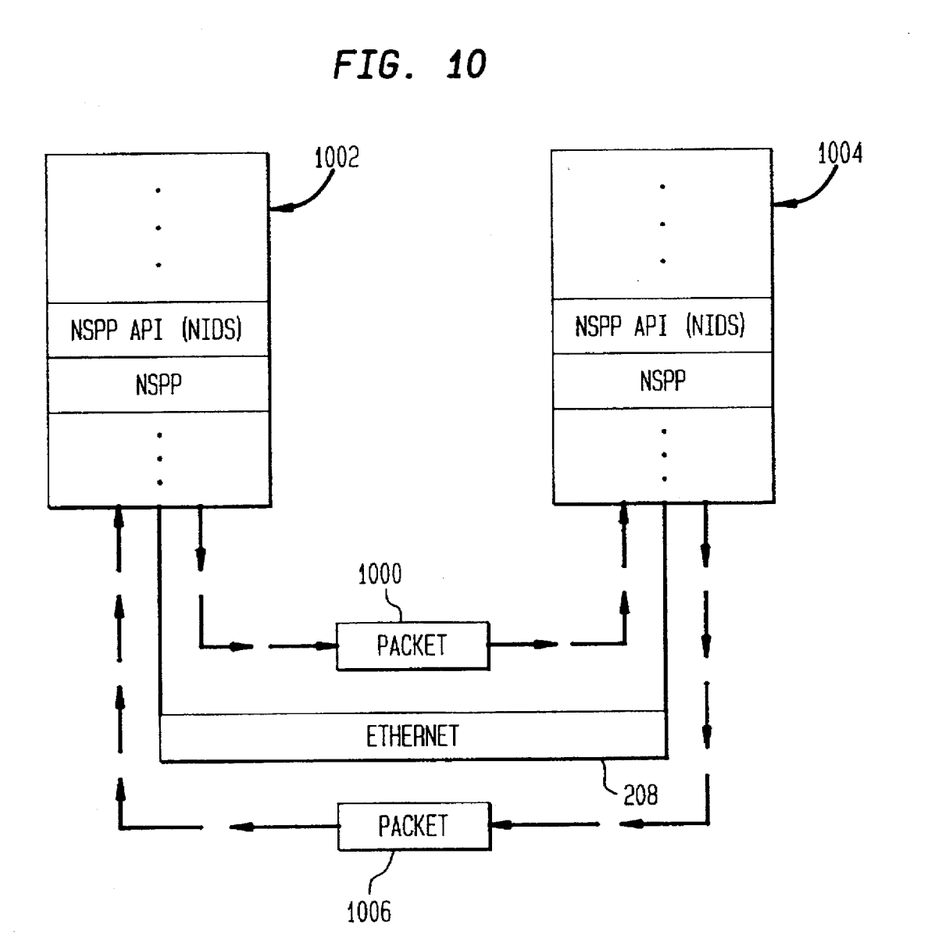
FIG. 10 shows an example transport between a packet sender and a packet recipient.

The purpose of the Ack Bit is to allow a data packet to request an acknowledgment of its receipt. The Ack Bit is usable, for example, in the NSPP environment. The Ack Bit is located in the protocol modifier bits of the NSPP header. Packets are sent in a sequence from a source to a final destination, e.g. from a client application to a service on a server. FIG. 10 shows a packet 1000 being sent from a source 1002 to a final destination 1004. Each packet 1000 that is sent is assigned sequence number information as it is sent to the final destination 1004. The sequence number information is stored in the NSPP header of the packet. Upon receipt of the packet by the final destination 1004, the NSPP software is triggered by the Ack Bit to send an acknowledgment of the receipt of the packet back to the source 1004. As a result, a return packet 1006 is sent back to the source 1002. The return packet 1006 includes the sequence number information of the packet 1000 that was sent to the final destination 1004 and that included the Ack Bit. When the return packet 1006 is received by the source 1002, the source 1002 compares the sequence number in the return packet 1006 with the sequence number of the packet 1000. The source 1002 confirms that the transmission of the data packet to the final destination 1004 has been successful if the sequence number information matches. If the sequence numbers information is incorrect, then either the Ack Bit is still outstanding (has not been read or opened yet), or a data packet has been lost, and retransmission of previous data packet 1000 is needed.

For purposes of illustration only, instances of when the Ack Bit may be requested are as follows:

Server is transmitting a switch invoke service, single packet and needs confirmation that a Console Client 202, 204 or 206 has received the data packet.

A Validation Server needs to transmit a single packet response back to the Console Client 202, 204 or 206 and wants to insure its response was received.

To eliminate the double-send scenario and wait for an acknowledgment instead.

B. Setting the Ack Bit

The Ack Bit is defined as the high-order bit of the protocol modifier bits of the NSPP header between the packet type and the current packet number. A value of 1 requests an acknowledgment response for that packet. Whether the message is multiple packets or a single packet, only the packet with the bit set, requests the response. The remaining bits of the byte are reserved for future use. Any server or client can set the Ack Bit.

The NSPP software sets the Ack Bit in data packets only. The NSPP software sets the Ack Bit to replace the current double send scenario. For example, when the DOS Console responds to an unsolicited switch message. The Ack Bit can be set at other times too (e.g., when verification that the data packet has been received is desired).

C. Response to the Ack Bit

If a received data packet has the Ack Bit set, then the NSPP software shall respond prior to processing the message request, with sequence numbers information in either a data packet or a control packet (a packet only including sequence numbers without data), depending on the circumstances, as will be discussed below. The NSPP software sends an Ack Bit response including the Last Received Packet number, which is the packet number last received in the sequence. This last received packet number is confirmed by the source as discussed earlier. Note, before responding to an Ack Bit, the NSPP software insures the incoming sequence numbers are sequential. For example the Last Received Packet number may indicate a packet was lost if it is out of sequence.

The circumstances for responding to an Ack Bit with either a data packet or a control packet are detailed here:

If the transmit window is open and there is more data to send, then the NSPP software transmits the sequence number information with the next data packet to transmit. If all the previous transmitted data has been acknowledged and there currently is no more data to send, then the NSPP software shall transmit the sequence information in a control packet. Lastly, if not all the previously transmitted data has been acknowledged and there is no more data to send, then the NSPP software shall re-send the most outstanding, non-acknowledged data packet with the current sequence number information included.

D. Reliability

Reliability represents a means for the NSPP server services to ensure delivery of a packet when the Ack Bit is set. The NSPP server software makes use of timers and retransmissions of messages to ensure the packet is received by the client. The timers and retransmission are defined by the NSPP server services. For example, after an Ack Bit is requested, a per-service-defined timer is set, to wait for the response to the Ack Bit. If one is not received, then the packet can be re-transmitted, up to the number of per-service-defined retries. When the number of retries is exhausted then the packet is discarded. If the service does not indicate a unique service timer or number of retries, then default values are used. The NSPP client software does not implement reliability in this way, because it already has a defined timer on packets awaiting response over the network.

The NSPP server services shall indicate a timer for each packet it requests an Ack Bit for. The timer is a service-defined time delay. If the timer is not specified then, the NSPP server software uses a default value, which varies depending upon the service. The NSPP server service also indicates the retry limit for the packet transmission. The retry limit indicates the number of times a packet can be transmitted after a response has not been received within the Ack Bit timer. If the retry limit is not specified then, the NSPP server software uses the default values.

If the Ack Bit response, which is the expected sequence information, is not received within that specified time, then the NSPP server software checks to determine if the packet can be re-transmitted. If the number of times the message has been transmitted exceeds the application-defined number of retries, then the packet can not be transmitted again, and is discarded. If the packet can be re-transmitted again, then the NSPP server software requests an Ack Bit and starts the sequence of events again. If the expected sequence information is received within the specified time, then the NSPP server software will be done with the packet, no more retransmissions after the timer expires.

If any sequence information is received, the NSPP server software checks the sequence numbers received, with those expected and takes appropriate action. Note, there is the possibility that duplicate packets may be sent, but, in the end, this does not affect the assurance of receipt of the packet. For example: the server is transmitting packet number 10, and last received packet number 31, with the Ack Bit set. The client may transmit data before it receives packet number 10 from the server and include sequence information, sending packet number 32, and last received packet 9. When the server receives this, it is not the expected sequence information and continues to wait for a received packet with the expected sequence information. If the timer expires, then it should retransmit the packet number 10 with the Ack Bit still set. The client meanwhile has received the original packet number 10, and responded to the Ack Bit with sequence information, send packet number 33 now, and last received packet number 10. In addition, when the client receives the retransmission of packet number 10, it sends out a control packet acknowledging the duplicate packets. The Server may ignore the duplicate sequence information if it has not transmitted new data yet, or else the sequence of events may continue.

Note, reliability is a change in the NSPP protocol, along with a change in the Applications that reside on top of NSPP server software. These applications use configuration files to indicate the timer and number of retries for each application. For example, the Backend Server looks at the configuration file ACK.CFG. This file may contain a line such as "CALL_OFFER 150". This means that when the application transmits a Call Offer, it will request the NSPP software to transmit the packet with the Ack Bit set, and the NSPP Server software will set a timer for 150 milliseconds between resends, with the default number of retries (2). The acceptable formats for the BE Server are indicated in the following Table:

| Sample of Reliability Entries in the ACK.CFG file | |
|---|---|
| ACK.CFG Entry | Explanation: |
| CALL_OFFER 150 4 | Use Retry Timer of 150 ms |
| | Use the Retry Attempts of 24 |

-continued

| Sample of Reliability Entries in the ACK.CFG file | |
|---|---|
| ACK.CFG Entry | Explanation: |
| CALL_OFFER 100 | Use Retry Timer of 100 ms |
| | Use the Default Retry Attempts of 2 |
| CALL_OFFER | Use Default Retry Timer of 2 sec. |
| | Use the Default Retry Attempts of 2 |

E. Ack Bit Configuration

Due to the requirement to transition in a controlled manner and limit the changes over the network, the NSPP change to request an Ack Bit has been made configurable. This allows the Ack Bit to be turned on or off without a recompile. This capability also assists in integrating and testing the software, by limiting the number of possibilities to troubleshoot.

The NSPP software is capable of configuring whether or not an Ack Bit is transmitted. The NSPP software shall respond to a packet received with the ACK Bit set, regardless of the ACK Bit Configuration.

Conclusion

While the invention is particularly shown and described with reference to preferred embodiments thereof, it will be understood by those skilled in the art that various changes, from the foregoing and other changes, in form and details may be made therein without departing from the spirit and scope of the invention.

What is claimed is:

1. A method for acknowledging receipt of a data transfer between a client and a server in a NSPP environment, said method steps comprising:

(1) sending a packet from a source location to a destination location, wherein said packet includes an acknowledgment bit and a first sequence number stored in a NSPP header of said packet;

(2) receiving said packet at said destination location, wherein said acknowledgment bit triggers NSPP software;

(3) sending a control packet generated by said NSPP software from said destination location to said source location, wherein said control packet includes a second sequence number; and (4) receiving said control packet at said source location and comparing said first sequence number and said second sequence number, wherein receipt of said packet at said destination location is confirmed when said first sequence number matches said second sequence number.

2. The method according to claim 1, further comprising the step of:

resending said packet to said destination location if said first sequence number fails to match said second sequence number.

3. The method according to claim 1, further comprising the step of:

initializing said acknowledgment bit in said NSPP header of said packet.

4. The method according to claim 1, further comprising the step of:

resending said packet to said destination location if said control packet fails to be received within a specified time period.

5. The method of claim 1, further comprising the step of:

setting said acknowledgment bit with said NSPP software, wherein said acknowledgment bit is set by either the client or the server.

6. The method of claim 1, further comprising the step of:

turning said acknowledgment bit on or off without having to recompile said NSPP software.

7. The method of claim 2, further comprising the step of:

sending a further packet from said source location to said destination location prior to receiving said control packet from said destination location.

8. A system for enabling a packet to request acknowledgment of its receipt in a NSPP environment, the system comprising:

means for sending a packet from a source location to a destination location, wherein said packet includes an acknowledgment bit and a first sequence number stored in a NSPP header of said packet;

means for receiving said packet at said destination location, wherein said acknowledgment bit triggers NSPP software;

means for sending a control packet generated by said NSPP software from said destination location to said source location, wherein said control packet includes a second sequence number; and means for receiving said control packet at said source location and comparing said first sequence number and said second sequence number, wherein receipt of said packet at said destination location is confirmed when said first sequence number matches said second sequence number.

9. A system according to claim 8, further comprising:

means for resending said packet to said destination location if said first sequence number fails to match said second sequence number.

10. A system according to claim 8, further comprising:

means for initializing said acknowledgment bit in said NSPP header of said packet.

11. A system according to claim 8, further comprising:

means for resending said packet to said destination location if said control packet fails to be received within a specified time period.

12. The system of claim 8, further comprising:

means for setting said acknowledgment bit with said NSPP software, wherein said acknowledgment bit is set by either the client or the server.

13. The system of claim 8, further comprising:

means for turning said acknowledgment bit on or off without having to recompile said NSPP software.

14. The system of claim 9, further comprising:

means for sending a further packet from said source location to said destination location prior to receiving said control packet from said destination location.

15. A program storage device readable by a machine, tangibly embodying a program of instructions executable by the machine to perform method steps for acknowledging receipt of a data transfer between a client and a server in a NSPP environment, said method steps comprising:

(1) sending a packet from a source location to a destination location, wherein said packet includes an acknowledgment bit and a first sequence number stored in a NSPP header of said packet;

(2) receiving said packet at said destination location, wherein said acknowledgment bit triggers NSPP software;

(3) sending a control packet generated by said NSPP software from said destination location to said source location, wherein said control packet includes a second sequence number; and (4) receiving said control packet at said source location and comparing said first sequence number and said second sequence number, wherein receipt of said packet at said destination location is confirmed when said first sequence number matches said second sequence number.

16. The program storage device according to claim 15, further comprising the step of:

resending said packet to said destination location if said first sequence number fails to match said second sequence number.

17. The program storage device according to claim 15, further comprising the step of:

initializing said acknowledgment bit in said NSPP header of said packet.

18. The program storage device according to claim 15, further comprising the step of:

resending said packet to said destination location if said control packet fails to be received within a specified time period.

19. The program storage device according to claim 15, further comprising the step of:

setting said acknowledgment bit with said NSPP software, wherein said acknowledgment bit is set by either the client or the server.

20. The program storage device according to claim 15, further comprising the step of:

turning said acknowledgment bit on or off without having to recompile said NSPP software.

21. The program storage device according to claim 16, further comprising the step of:

sending a further packet from said source location to said destination location prior to receiving said control packet from said destination location.

* * * * *